March 10, 1925.  1,528,923
A. H. HOFER ET AL
AIRCRAFT LANDING GEAR
Filed Aug. 1, 1921  5 Sheets-Sheet 2
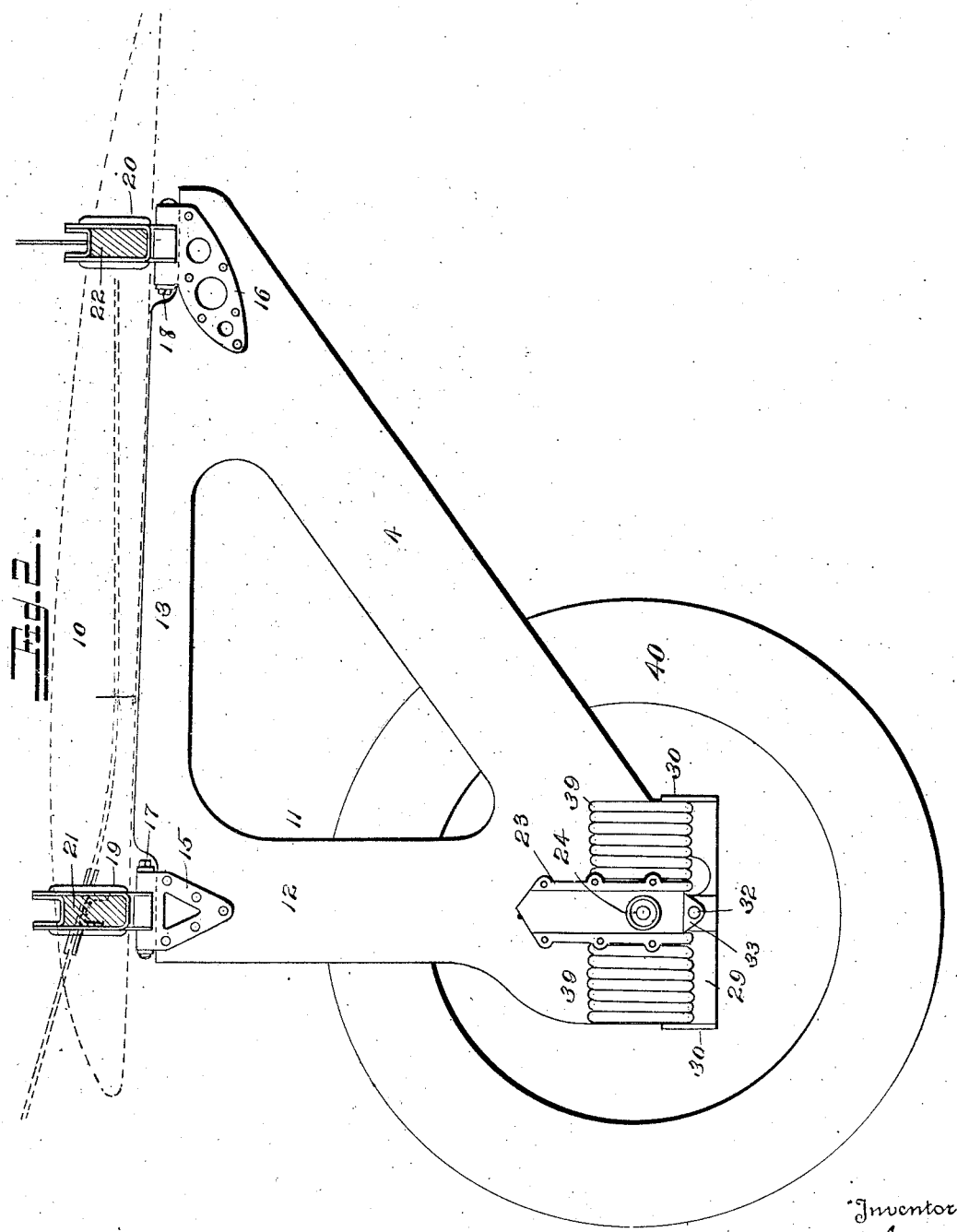

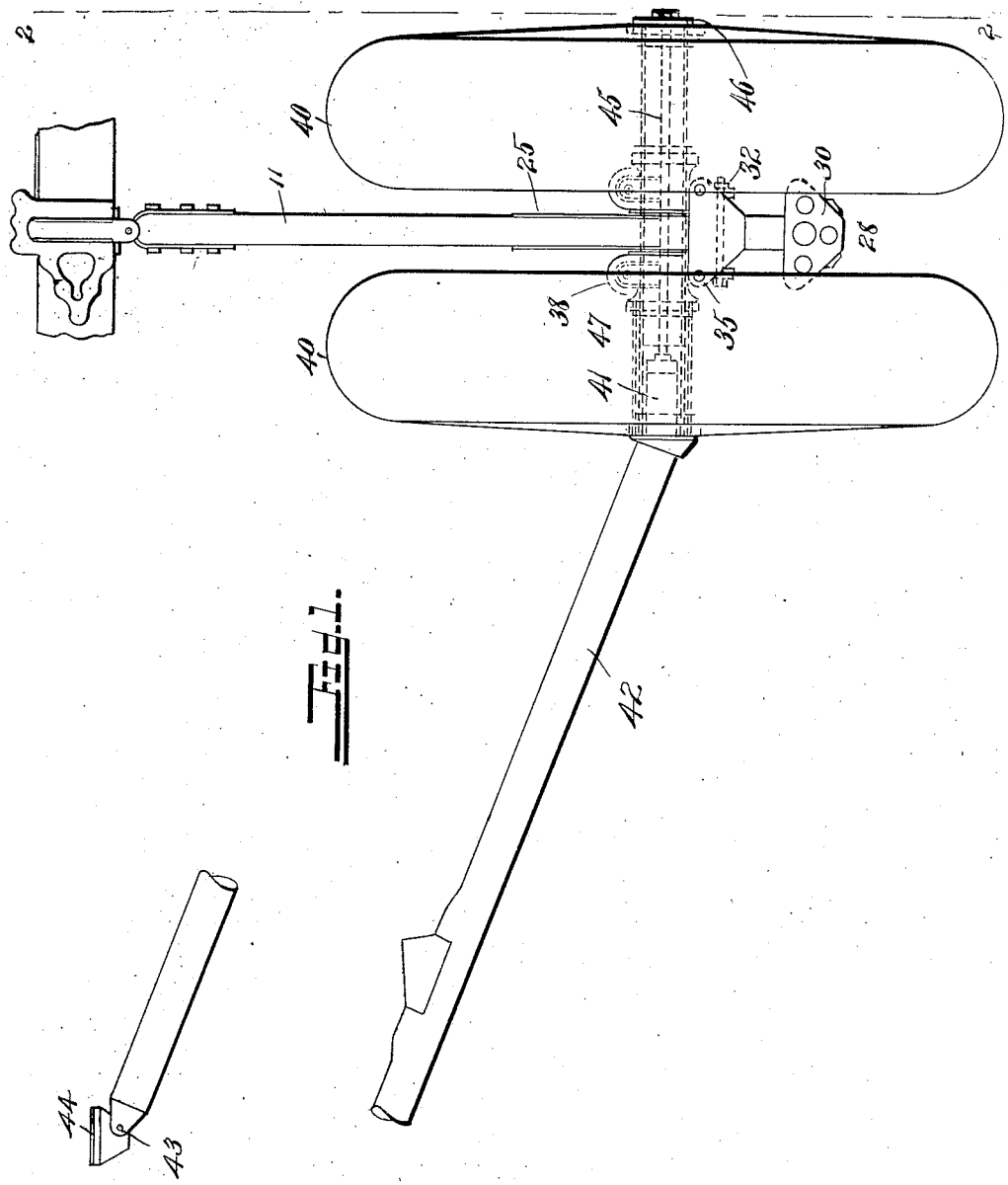

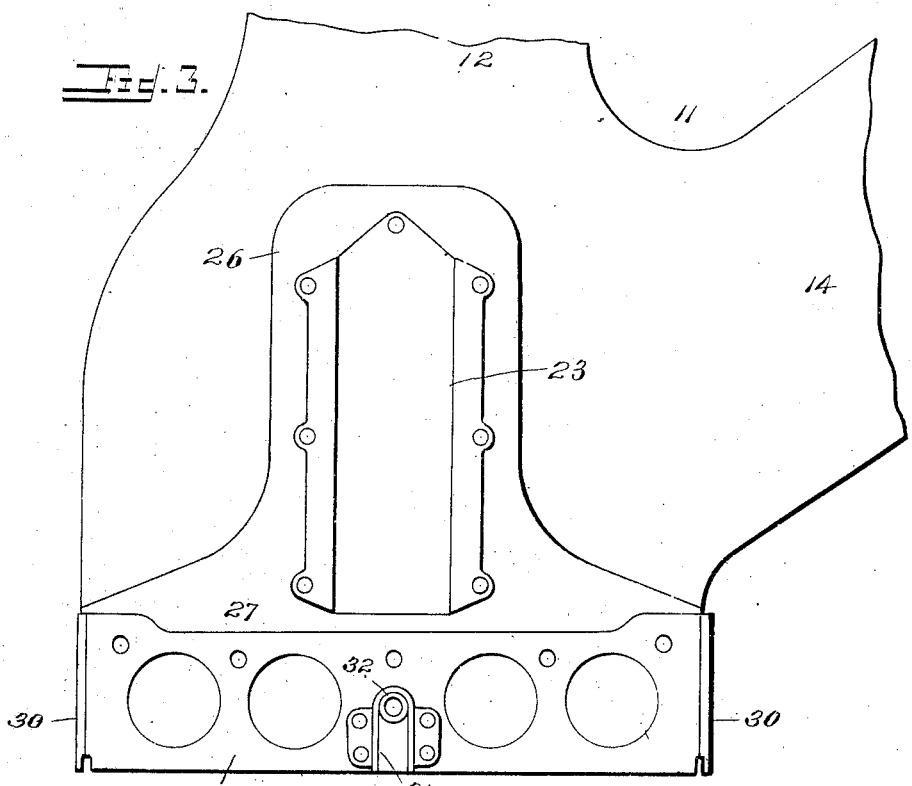
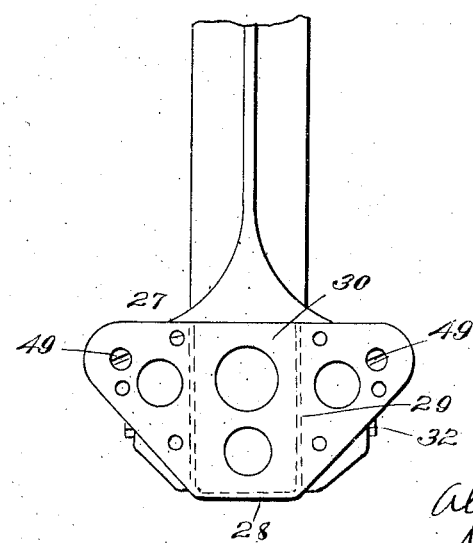

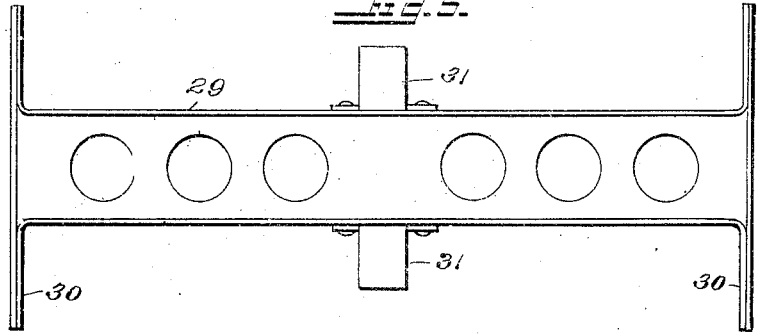
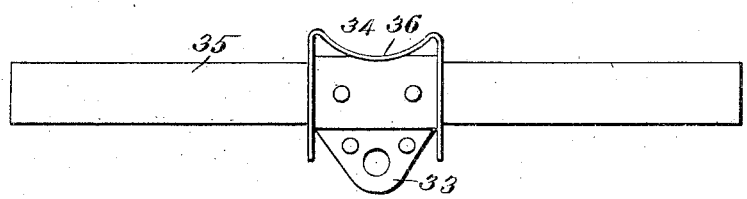
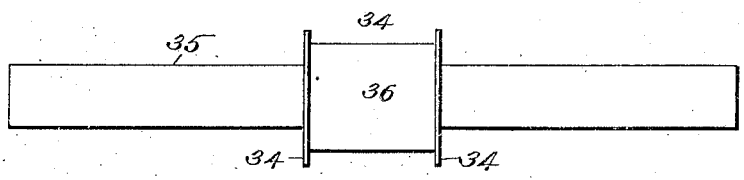
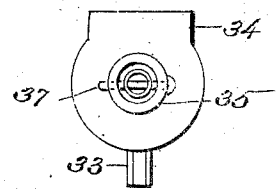

March 10, 1925.
A. H. HOFER ET AL
1,528,923
AIRCRAFT LANDING GEAR
Filed Aug. 1, 1921
5 Sheets-Sheet 5
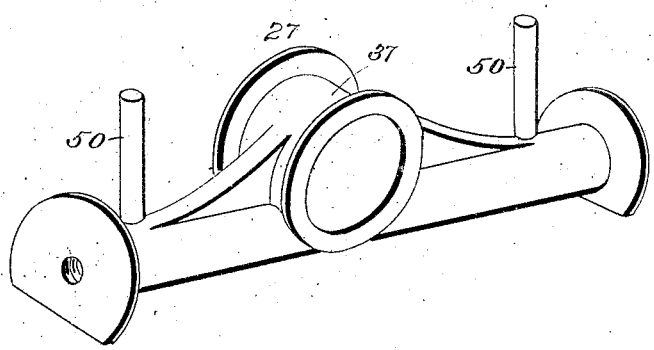
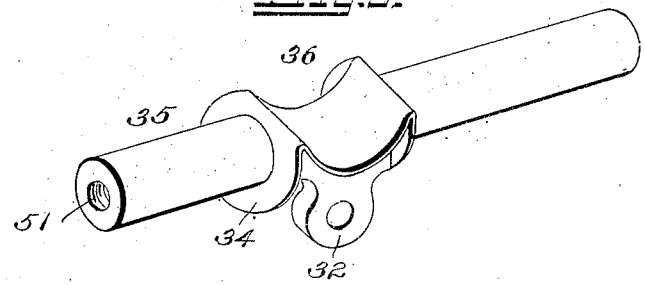
Inventor
Alfred H Hofer
Isaac M Laddon
By Robert H. Young  Attorney Patented Mar. 10, 1925.

1,528,923

UNITED STATES PATENT OFFICE.

ALFRED H. HOFER AND ISAAC M. LADDON, OF DAYTON, OHIO.

AIRCRAFT LANDING GEAR.

Application filed August 1, 1921. Serial No. 488,935.

*To all whom it may concern:*

Be it known that we, ALFRED H. HOFER and ISAAC M. LADDON, citizens of the United States, residing at Dayton, in the county of Montgomery and State of Ohio, have invented certain new and useful Improvements in Aircraft Landing Gears, of which the following is a specification.

This invention relates to aircraft landing gear and is adapted for use in connection with all types of aircraft, large and small.

One of the main objects of this invention is to produce a properly braced shock absorbing landing gear, in which the ordinary low down axle is eliminated, with the resultant advantage that ample road clearance is allowed, especially adapting the machine to take off and land in fields where there are high grass, weeds, grain, underbrush, and the like. This adds greatly to the factor of safety in the launching and landing of the machine by eliminating the tendency of the machine to nose over while rolling through high grass, for example.

Another important object of the invention is to provide simple means for mounting and demounting the landing wheels in relation to their axles and the remainder of the landing gear including the struts and braces. This part of the invention also comprises means for mounting and demounting the shock absorbing units, the invention as a whole rendering the parts of the landing gear accessible for any purpose whatsoever.

Another object of the invention is to provide in conjunction with the wheels and the landing gear struts and their braces, highly efficient shock absorbing units, each embodying means for automatically equalizing the stresses on the yieldable members such as elastic cords or the convolutions thereof, which cords absorb the landing shocks, the strain on said cords being thus equalized or distributed throughout all portions thereof. This greatly increases the factor of safety of the elastic cords and adds materially to the life of the shock absorbing units of the landing gear.

With the above and other objects in view, the invention consists in the novel construction, combination and arrangement herein fully described, illustrated and claimed.

In the accompanying drawings,

Fig. 1 is a front elevation of a sufficient portion of the central part of an airplane to show the improved landing gear, dotted lines being used to indicate the manner of mounting and demounting the wheels;

Fig. 2 is a vertical section on the line 2—2 of Fig. 1, showing a landing gear strut in elevation;

Fig. 3 is a fragmentary side elevation of one of the landing gear struts with the saddle attached;

Fig. 4 is a front elevation thereof with the wheels broken away to show the saddle;

Fig. 5 is a plan view of the saddle;

Fig. 6 is a side elevation of one of the stretchers with the bumper attached;

Fig. 7 is a plan view thereof;

Fig. 8 is an end view of the same;

Fig. 9 is a perspective view of one of the stretcher bars;

Fig. 10 is a perspective view of one of the hanger bars inverted.

Referring to the drawings, 10 designates a part of an aircraft such as the bottom plane or one of the wings of an airplane. In carrying out the present invention, in the preferred embodiment thereof, we make use of a pair of struts 11, said struts being arranged equidistantly from the central longitudinal axis of the aircraft. Each of said struts is shown of triangular formation comprising the forward, substantially vertical part 12, the upper and approximately horizontal part 13, and the rearwardly and upwardly inclined part 14, it being understood that all of said parts 12, 13 and 14 are formed integrally and constitute a single, one piece strut.

Each landing gear strut 11 is connected to the member 10 of the airplane to swing on a fore and aft axis. To that end the strut is provided with front and rear fittings 15 and 16, respectively, which are fastened to the strut by bolts or otherwise and are connected by hinge pins or pivot bolts 17 and 18 to complemental fittings 19 and 20 fastened to the airplane member 10. As shown, the fittings 19 and 20 are also securely fastened to the main front and rear spars 21 and 22 of the bottom plane of the aircraft. It will now be understood that by means of the construction just described, the struts 11 when otherwise free may be swung laterally on the pivots 17 and 18 for a purpose which will presently appear.

Each of the struts 11 is formed in the lower part thereof with a slot 23 to permit the axle 24 of the adjacent wheel or wheels to play upwardly and downwardly therein in order that the landing shocks may be absorbed. The slot 23 has a metal liner or reinforcing member 25 which provides a metal runway or guideway for the axle hereinafter referred to, said liner being flanged as shown at 26 and the flanges thereof being securely fastened to the opposite sides of the strut, the latter being ordinarily of wood of laminated construction.

At the bottom of each strut there is a saddle 27 comprising a bottom portion 28 which extends under the bottom of the strut and side portions 29 which embrace opposite sides of the lower part of the strut and end plates 30 which lie in front and in rear of such lower portion of the strut and extend laterally a considerable distance beyond the same as shown in Fig. 5. The saddle also comprises a pair of lateral, U-shaped bearings 31 secured centrally thereto and projecting in opposite directions therefrom, as shown best in Fig. 5, said bearings 31 receiving a bolt 32, the latter passing through lugs 33 extending downwardly from the center of a stretcher bar 35 shown in the form of a tubular rod which underlies the wheel axle. The bumper 34 has its upper axle contacting surface concaved as shown at 36 to substantially conform to the curvature of the axle sleeve 37 against which it abuts. The bumper 34 is shown as forming a part of the stretcher bar 35, but it may be made separately and secured thereto by one or more fasteners. It is to be understood that two of such stretcher bars 35 are used in conjunction with each saddle 27 and arranged at opposite sides of the strut 11, as shown in Fig. 1.

Extending above the axle 24 and in superposed relation to the stretcher bars 35 are hanger bars 38 similar in size to the stretcher bars and having axle embracing sleeves 37. Extending between and around the stretcher bars and hanger bars are yieldable means such as elastic cords 39. These cords are wrapped around the hanger bars and the respective stretcher bars and the ends of said cords suitably anchored or fastened as by having eyes at the ends of the cord to slip over the ends of the hanger bar. This permits the landing gear strut to move downwardly in relation to the wheel axle so as to absorb landing shocks. The elastic cord 39 may, of course, be placed under any desired or necessary tension to support the load and absorb the landing shocks.

Under the construction shown and described, we employ in conjunction with each shock absorbing unit and landing gear strut, two wheels 40, the same being arranged at opposite sides of the strut and both being mounted on the common axle 24 which is only of sufficient length to extend through and connect both of said wheels. The axle 24 is of tubular formation, as shown, and fits over a stub axle 41 at the lower end of an inclined brace or axle bracing extension 42, the latter extending upwardly and inwardly toward the center of the airplane where it is attached by means of a pivot 43 to a fitting 44 fastened to the member 10 of the airplane. As shown in Fig. 1, the two braces 42 are pivotally connected to the same central fitting 44. By means of the arrangement just described ample road or field clearance is provided for enabling the machine to be maneuvered with safety in fields where there are high grass, weeds, grain, underbrush, and the like. In order to provide for mounting and demounting the wheels, resort is had to a bolt 45 which extends through a detachable stop collar or washer 46 at one end and is threaded into the stub axle 41, as shown at 47. It will now be understood that by removing the bolt 45, the strut 11 may be swung laterally on its pivotal connection with the airplane member 10. In this operation, the wheels 40 and the shock absorbing unit above described are slid off the axle, the brace 42 at the same time swinging on its pivotal connection 43 to permit said wheels and shock absorber to be slid off the axle. To again mount the wheels, the operation just described is reversed. This provides for the necessary accessibility to the wheels and shock absorbing units and enables both wheels of each part of the landing gear to be detached in order to effect tire repairs and other adjustments. On account of the pivotal connection between the stretchers and the saddle, the stresses on the different wrappings or convolutions of the elastic cords are distributed, thereby prolonging the life of the shock absorbers.

We do not desire to be limited to the particular construction shown and described, it being apparent that the parts of the landing gear are susceptible of considerable variation without departing from the principle or sacrificing any of the advantages of the invention.

Each shock absorbing unit is made up in the shop or factory and the elastic cords are wrapped thereon by a machine or in any other way and adjusted to any required tension. The unit is capable of being instantly detached and replaced and is of known strength. The tedious and laborious work of wrapping the elastic cord on assembled machines on the field is thus overcome. Instead of elastic cords, cords or bands of pure rubber may be employed, or coiled or helical springs. It is also practicable to employ in lieu of such cords, any cushioning means such as pneumatic or liquid cylinders arranged singly or in multiple. In every case, one member of the shock absorber is movable while the other is stationary in relation to the axle. The shock absorber unit may be detached by the removal of two or more bolts or pins.

In addition to the means above referred to, each of the stretcher bars is held at both ends by means of cap screws 48 inserted through holes 49 in the end plates of the saddle and into threaded sockets 51 in the opposite ends of the stretcher bar. Each stretcher bar is thus held at three points in relation to the saddle or, in other words, centrally and at both ends. While the bumper 34, in conjunction with the axle sleeve 37, forms a spacing means for holding the stretcher bar and the hanger bar in a certain definite relation to each other while under the tension of the elastic cord or other yieldable means, we may, if desired, use additional spacing means such as spacing pins 50 projecting from the under side of the hanger bar and bearing against the top of the stretcher bar as illustrated. This prevents any deflection of said bars when the elastic cord is wrapped tightly around the same. By means of the construction just described, when the strut and axle have been disconnected from each other and one of the wheels removed from the axle, each shock absorbing unit may be removed by simply taking out the cap screws at the ends of the stretcher bar and removing the center bolt 32 or sliding the shock absorbing unit off of said bolt. The shock absorbing units may be replaced in the same manner. The removal and replacement of each shock absorbing unit is thus easily and quickly effected and there is no disturbance of the tension of the yieldable means.

I claim:

1. In aircraft landing gear, a strut hinged to be swung laterally with respect to the longitudinal axis of the machine, and a brace for said strut having an axle for the landing wheel movable in a substantially vertical plane the strut being adapted to be swung clear of the axle to permit mounting and demounting of the wheel.

2. In aircraft landing gear, a strut, an axle therefor having a bracing extension, and a wheel between the strut and said bracing extension slidable on and off said axle, the strut and bracing extension of the axle being pivotally mounted on parallel axes to permit the wheel to be mounted and demounted.

3. In aircraft landing gear, a strut, an axle therefor having a bracing extension, and wheels on said axle at opposite sides of the strut, the strut and bracing extension being mounted in such manner as to permit the strut to swing clear of the axle and admit of the removal of the wheels from the axle.

4. In aircraft landing gear, a strut, an axle therefor, and a wheel on said axle, said strut and axle being pivotally mounted on substantially parallel but distantly located axes, the axle, strut and wheel having a sliding and detachable fit to admit of separation of the strut, axle and wheel.

5. In aircraft landing gear, a strut, an axle therefor, a wheel on said axle, said strut and axle being pivotally mounted on substantially parallel but distantly located axes, the axle, strut and wheel having a sliding and detachable fit to admit of separation of the strut, axle and wheel, and means for retaining all of said parts in assembled relation.

6. In aircraft landing gear, a triangular strut, an axle therefor, and a wheel on said axle, said strut and axle being pivotally mounted on substantially parallel but distantly located axes, the axle, strut and wheel having a sliding and detachable fit to admit of separation of the strut, axle and wheel.

7. In aircraft landing gear, the combination with an aircraft, of landing gear struts thereunder located equidistantly from the longitudinal center of the craft and pivotally attached to the bottom of the craft, axle members pivotally attached at their inner ends to the craft and inclining downwardly and laterally therefrom to the struts, the struts having a sliable and detachable connection with the axle members, and wheels on said axles adjacent to the struts.

8. In aircraft landing gear, a strut, an axle movable up and down in relation thereto, a wheel on said axle, shock absorbing means embodying a saddle on the strut, a superposed hanger supported by the axle, a stretcher having a tiltable connection with the saddle, and yieldable means connecting said stretcher and hanger.

9. In aircraft landing gear, a strut, an axle movable up and down in relation thereto, a wheel on said axle, shock absorbing means embodying a saddle on the strut, an elongated hanger provided with a transverse hole adapted to fit over said axle, a stretcher attached to said saddle, curved coacting bearing surfaces on said hanger and stretcher, coaxial with said axle to permit relative pivotal movement of said hanger and stretcher and to space said hanger and stretcher apart, and shock absorbing cord wound around said hanger and stretcher.

10. In aircraft landing gear, a strut, an axle movable up and down in relation thereto, a wheel on said axle, shock absorbing means embodying a saddle on the strut, superposed hangers supported by the axle, stretchers having jointed connection with the saddle at opposite sides of the strut, and yieldable means connecting said hangers and stretchers.

11. In aircraft landing gear, a strut, an axle movable up and down in relation thereto, a wheel on said axle, shock absorbing means embodying a saddle on the strut, superposed hangers supported by the axle, stretchers having jointed connection with the saddle at opposite sides of the strut, axle bumpers on said equalizers, and yieldable means connecting said hangers and stretchers.

12. In aircraft landing gear, a strut, an axle movable up and down in relation thereto, a wheel on said axle, shock absorbing means embodying a saddle on the strut, superposed hangers supported by the axle, stretchers having central pivotal connection with the saddle at opposite sides of the strut, and yieldable means connecting said hangers and stretchers.

13. In aircraft landing gear, a shock absorbing unit embodying a hanger bar supported on the axle, a stretcher bar passing under the axle and connected with the frame of the machine to be depressed thereby, yieldable means connecting said hanger bar and stretcher bar, and means for holding said bars in a definite relation to each other to admit of the removal and replacement of the shock-absorbing unit while the yieldable means remains under tension.

14. In aircraft landing gear, a strut, an axle therefor and a wheel on said axle, said strut and axle being pivotally mounted on substantially parallel but distantly located axes, the axle, strut and wheel having a sliding and detachable connection to admit of separation of the strut, axle and wheel, and yieldable means connecting said hanger bar and stretcher bar, and spacing means for holding said bars in a definite relation to admit of the removal and replacement of the shock absorbing unit while the yieldable means is under tension.

In testimony whereof we have affixed our signatures.

ALFRED H. HOFER.
ISAAC M. LADDON.